United States Patent
Juneja et al.

(10) Patent No.: US 12,425,835 B2
(45) Date of Patent: Sep. 23, 2025

(54) SYSTEMS AND METHODS TO DESIGNATE SUBSCRIPTION PRIORITY TO SET A GAIN STATE IN A MULTI-SUBSCRIBER IDENTITY MODULE DEVICE

(71) Applicant: QUALCOMM Incorporated, San Diego, CA (US)

(72) Inventors: Raveesh Juneja, Hyderabad (IN); Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 17/811,481

(22) Filed: Jul. 8, 2022

(65) Prior Publication Data
US 2024/0015498 A1    Jan. 11, 2024

(51) Int. Cl.
*H04W 72/00* (2023.01)
*H04B 1/12* (2006.01)
*H04W 8/18* (2009.01)
*H04W 72/56* (2023.01)

(52) U.S. Cl.
CPC .............. *H04W 8/183* (2013.01); *H04B 1/12* (2013.01); *H04W 72/56* (2023.01)

(58) Field of Classification Search
CPC ......... H04W 8/183; H04W 72/56; H04B 1/12
See application file for complete search history.

(56) References Cited

U.S. PATENT DOCUMENTS

| | | | |
|---|---|---|---|
| 8,078,094 B1* | 12/2011 | Huber | H04W 88/085 |
| | | | 455/571 |
| 10,841,873 B2* | 11/2020 | Wong | H04W 8/183 |
| 11,910,479 B2* | 2/2024 | Zhao | H04M 1/72448 |
| 2017/0048855 A1* | 2/2017 | Garg | H04W 48/16 |
| 2021/0029773 A1* | 1/2021 | Majumder | H04W 8/183 |
| 2022/0104103 A1* | 3/2022 | Lee | H04W 8/183 |
| 2022/0295262 A1* | 9/2022 | Shahidi | H04W 72/569 |
| 2022/0295343 A1* | 9/2022 | Pefkianakis | H04W 36/304 |
| 2023/0370831 A1* | 11/2023 | Cheekatla | H04L 1/0002 |
| 2024/0015498 A1* | 1/2024 | Juneja | H04W 72/56 |

* cited by examiner

*Primary Examiner* — Julio R Perez
(74) *Attorney, Agent, or Firm* — Harrity & Harrity, LLP \ Qualcomm

(57) ABSTRACT

A method of wireless communication is performed by a user equipment (UE) that has a first subscriber identity module (SIM) and a second SIM. The method of wireless communication includes operating in a mode in which the first SIM is associated with a first subscription and in which the second SIM is associated with a second subscription, the first and second subscriptions being active at a same time and sharing radio frequency (RF) resources of the UE; designating the first subscription as having a higher priority status than the second subscription, analyzing a signal condition associated with the second subscription, and changing the higher priority status to apply to the second subscription based on the signal condition.

29 Claims, 8 Drawing Sheets

SYSTEMS AND METHODS TO DESIGNATE SUBSCRIPTION PRIORITY TO SET A GAIN STATE IN A MULTI-SUBSCRIBER IDENTITY MODULE DEVICE

TECHNICAL FIELD

This application relates to wireless communication systems, and more particularly to designating subscription priority in multi-subscriber identity module (multi-SIM) devices in co-banded situations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

However, including multiple SIMs within a device may lead to scenarios in which activities associated with one SIM may interfere with or preclude activities associated with the other SIM. There is a need in the art for techniques to manage use of multiple service provider subscriptions in multi-SIM devices.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) that has a first subscriber identity module (SIM) and a second sim is described. The method of wireless communication also includes operating in a mode in which the first SIM is associated with a first subscription and in which the second sim is associated with a second subscription, the first and second subscriptions being active at a same time and sharing radio frequency (RF) resources of the UE; designating the first subscription as having a higher priority status than the second subscription, analyzing a signal condition associated with the second subscription, and changing the higher priority status to apply to the second subscription based on the signal condition.

In an additional aspect of the disclosure, a user equipment (UE) includes a first subscriber identity module (SIM) associated with a first service provider subscription and a second SIM associated with a second service provider subscription; and a processor configured to access the first SIM and the second SIM, where the processor is further configured to: operate in a dual-SIM dual active (DSDA) mode in which a first communication session associated with the first service provider subscription is concurrently ongoing with a second communication session associated with the second service provider subscription; change a gain setting of a radio frequency (RF) component on behalf of the first service provider subscription, where the RF component includes an amplifier that is shared by the first service provider subscription and the second service provider subscription; freeze a second tracking loop associated with the second service provider subscription; swap a status setting associated with the first service provider subscription and the second service provider subscription, where the status setting once swapped allows for changing the gain setting of the RF component on behalf of the second service provider subscription and for freezing a first tracking loop associated with the first service provider subscription; and revert the status setting to disallow changing the gain setting of the RF component on behalf of the second service provider subscription and to freeze the second tracking loop.

In an additional aspect of the disclosure, a non-transitory computer-readable medium having program code recorded thereon for wireless communication by a user equipment (UE) includes code for concurrently supporting a first communication session associated with a first service provider subscription and a second communication session associated with a second service provider subscription, where the first service provider subscription and the second service provider subscription share radio frequency (RF) hardware of the UE; code for designating the first service provider subscription as having a higher priority status than the second service provider subscription, where the higher priority status allows the first service provider subscription to control a gain of the RF hardware; code for analyzing a signal condition associated with the second service provider subscription; and code for changing the higher priority status to apply to the second service provider subscription based on the signal condition.

In an additional aspect of the disclosure, a user equipment (UE) includes a first subscriber identity module (SIM) associated with a first service provider subscription and a second SIM associated with a second service provider subscription; means for concurrently supporting a first communication session associated with the first service provider subscription and a second communication session associated with the second service provider subscription; means for changing a gain setting of a radio frequency (RF) component on behalf of the first service provider subscription, where the RF component includes an amplifier that is shared by the first service provider subscription and the second service provider subscription; means for freezing a second tracking loop associated with the second service provider subscription; means for swapping a status setting associated with the first service provider subscription and the second service provider subscription, where the status setting once swapped allows for changing the gain setting of the RF component on behalf of the second service provider subscription and for freezing a first tracking loop associated with the first service provider subscription; and means for reverting the status setting to disallow changing the gain setting of the RF component on behalf of the second service provider subscription and to freeze the second tracking loop.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
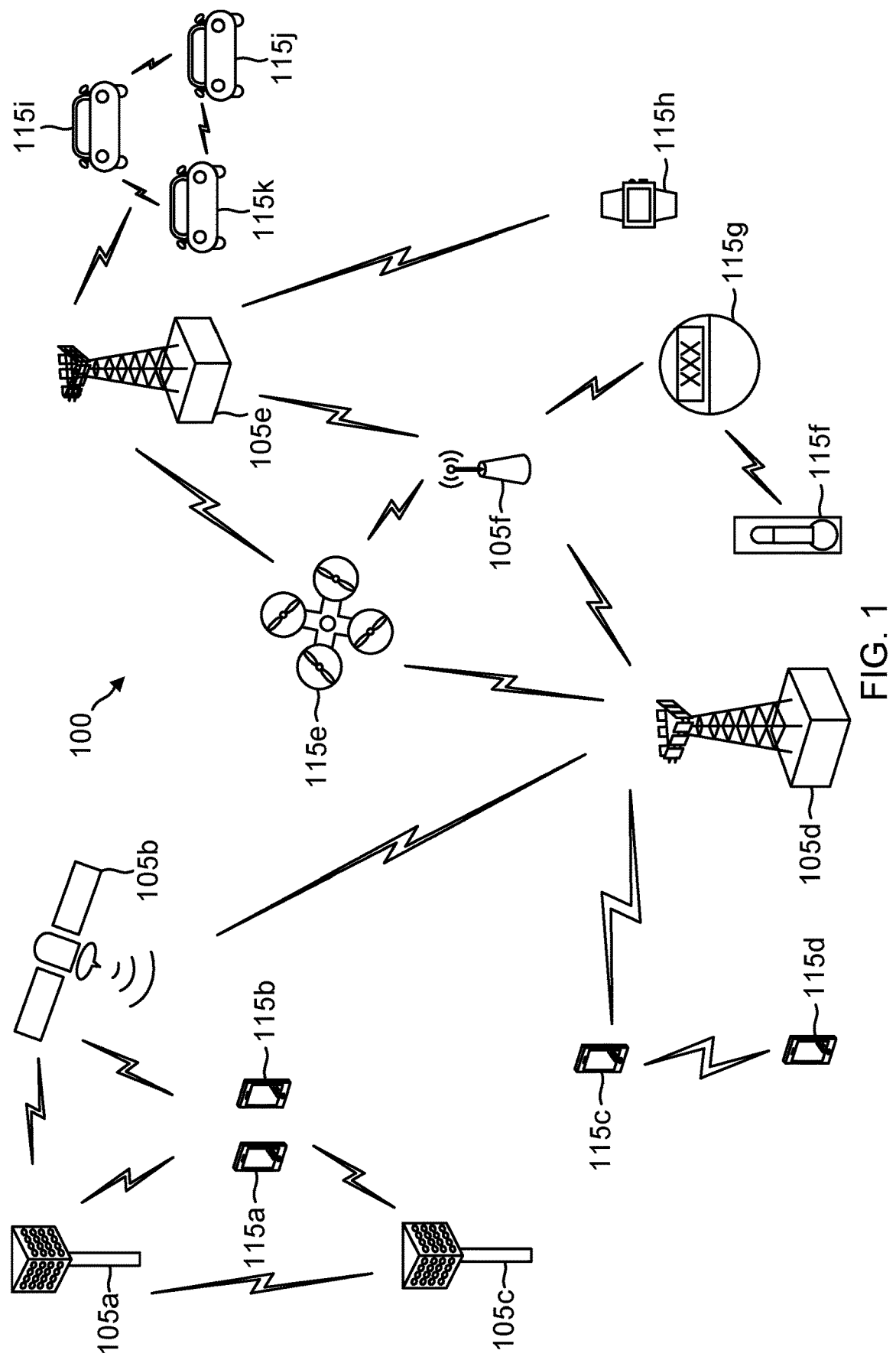
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (multi-SIM) device capable of utilizing multiple subscriptions for communication with one or more networks. For instance, the UE may include two SIMs, a first SIM for a first subscription and a second SIM for a second subscription. In some instances, the first and second subscriptions may be provided by the same service provider. For example, the first subscription and the second subscription may correspond to different user accounts and/or services on the same service provider network. In other instances, the first and second subscriptions may be provided by different service providers. In any case, in certain scenarios, the UE may communicate using the first subscription and/or the second subscription.

In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one subscription may be active at a given time. The DSDS mode may be suitable for UEs that are equipped with a single transceiver and/or radio frequency (RF) chain which can either be utilized by the first subscription or the second subscription.

In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

For a multi-SIM device, one of the SIMs/subscriptions carries the internet data traffic, and it is referred to as the default data subscription (DDS) The other subscription—nDDS—is mainly used for voice and short message service (SMS). The user chooses which subscription is the DDS, and the user may change the DDS through a user interface (UI) of the UE.

Some devices may have a hardware architecture that causes the different subscriptions to share low noise amplifier (LNA) configurations. For instance, a device may include a shared RF front end module that has an external LNA (eLNA) in communication with an antenna, and output from the LNA may be multiplexed between a first RF receive (RX) chain associated with the first subscription and a second RF RX chain associated with the second subscription. In DSDA use, for co-banded scenarios, the first subscription and the second subscription may be granted frequency domain resources that overlap. For instance, the first subscription may receive on the N1 band, and the second subscription may receive on the N1 band as well. As a result of the shared LNA architecture, the first subscription and the second subscription may share LNA configurations, so that the gain setting of the LNA may be optimal for one of the subscriptions, but the other subscription may operate in a best case effort by adjusting its gain using non-shared components.

The processor of the multi-SIM device may apply a service priority to the subscriptions. For instance the first subscription may have a higher service priority status, which allows the first subscription to control the gain setting on the shared components and disallows the second subscription from controlling the gain setting on the shared components. The second subscription would then adjust non-shared gain components in a best effort to apply a desired amount of gain. However, the difference in gain may in some instances be relatively large, such as 20-25 dB, though in other instances may be smaller.

When the first subscription changes the gain setting of a shared LNA, the gain setting change may cause a transient waveform that affects the non-shared components of the RF chains of both subscriptions. Therefore, one technique includes performing gain setting changes during a cyclic prefix (CP) of a given symbol so that the transient waveforms may be absorbed within the CP. However, if there is a timing difference between the two subscriptions in a co-banded scenario, then the symbols used by the two subscriptions and the CPs associated with the subscriptions may not align. In other words, the first subscription may align the gain setting changes with CPs in its own receive waveforms, but those gain setting changes may be aligned with data or even reference signals in the waveforms of the second subscription. This may lead to a performance impact for the second subscription. Examples of affected reference signals may include synchronization signal blocks (SSBs), tracking reference signals (TRS), demodulation reference symbols (DMRSs), and the like.

In a scenario in which the receive slots used by the first subscription do not align with the receive slots used by the second subscription, some systems may "freeze the loops" on the lower priority subscription (the second subscription) by disabling the second subscription from updating a frequency tracking loop or a time tracking loop and skipping reference signal measurements, at least for those measurement occasions that would be interrupted by gain setting changes.

In one example, the two subscriptions have nonaligned slots and connected mode discontinuous reception (CDRx) cycles, such that a warm up slot of the first subscription upon wakeup collides with an SSB or TRS of the second subscription. Continuing with the example, if a gain state change by the first subscription aligns with the SSB or TRS location on the second subscription, then the tracking loops of the second subscription may not have had an opportunity to run majority of the time. This may negatively affect reception by the second subscription, as drift in the tracking loops may cause reception deterioration.

In another aspect, for CDRx cases when a subscription wakes up, the system may restore the settings including gain of shared modules. In other words, the processor of the UE may undo any gain settings that the second subscription may have caused while the first subscription was asleep, and the settings may be sub optimal for the first subscription. However, restoring the settings may cause more gain setting changes, which may result in fewer opportunities for measurement and loop setting for the second subscription.

In one example implementation, a method of wireless communication is performed by a multi-SIM UE. The UE participates in a first communication session associated with a first SIM and participates in a second communication session associated with a second SIM. For instance, the UE may operate in DSDA mode in which both subscriptions are active at the same time. Further, in this example, the two subscriptions may share radio frequency (RF) resources of the UE, such as a LNA in an RF front end module. Furthermore, in this example, the first subscription and the second subscription have granted downlink (DL) resources in a same band (e.g., N1).

Continuing with the example, the UE may designate the first subscription as having a higher priority status than the second subscription for performing reference signal measurements and updating tracking (frequency and/or timing) loops as appropriate. In other words, only the first subscription is permitted to change a gain of shared resources, such as an eLNA, and the second subscription is disallowed from making reference signal measurements and updating tracking loops in response to the reference signal measurements. Priority status may be set as a default based on any appropriate factor. In an example, default priority status is based on a type of application that is running on the respective subscriptions. For instance, the UE may have a defined hierarchy of default priority that assigns a highest priority to voice and video calls, the second highest priority to gaming applications, a third highest priority to web browsing, etc. In this example, the first subscription may be associated with the voice or video call, the second subscription may be associated with a gaming application so that the UE assigns the highest priority status to the first subscription and a lower priority status to the second subscription.

The UE may analyze a signal condition associated with the second subscription and then change the higher priority status to apply to the second subscription based on the signal condition. For instance, delay spread and power difference between the first subscription and the second subscription may be measured and, depending on the measurement, the priority of the subscriptions may be changed.

Continuing with the example, for instances in which the power difference is within a threshold (e.g., 6 dB), the UE may then periodically swap the priorities of the two subscriptions to allow both subscriptions to make measurements and adjust loops, thereby providing fairness in allowing the subscriptions to estimate loop metrics. If the power difference between the signals of the subscriptions is above the threshold (e.g., 6 dB), then periodically swapping the priority may not be the best option if it may cause one of the subscriptions to drop a communication session due to an undesirable estimation of loop metrics. Instead, some implementations may mark a subset of RF chains as high priority, where some of those high-priority chains are associated with the first subscription and others are associated with the second subscription. Such technique may act as a compromise between the two subscriptions, as it would be expected that even in cases in which the power difference is above the threshold, a subset of the RF chains can run and operate the loops with regular periodicity and prevent undesired loop drifting.

As noted above, changing the higher priority status from one subscription to the other may be performed in response to analyzing a signal condition. However, the scope of implementations may change the priority in response to mobility of one or both subscriptions as an alternative to or instead of basing the description on analyzing the signal condition. For instance, if a mobility event frequency difference between the first subscription and the second subscription is below a threshold, the higher priority status may be swapped periodically between the subscriptions. However, if the frequency of mobility events for the first subscription is substantially different than that of the second subscription (e.g., the difference in frequency of the mobility events is above a threshold), then the RF chains may be assigned priority independently, as in the example above with respect to signal condition.

Various implementations may include advantages. For instance, implementations providing for changing priority between the subscriptions may provide a smooth transition for the second subscription whenever the first subscription is active, thereby minimizing the throughput impact on the second subscription and providing the second subscription a better quality of service than it would otherwise receive. Increasing the throughput of a subscription, or at least reducing an impact on the throughput of the subscription, may increase the overall throughput and efficiency of the multi-SIM device.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115$a$-115$d$ are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115$e$-115$h$ are examples of various machines configured for communication that access the network 100. The UEs 115$i$-115$k$ are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105$a$-105$c$ may serve the UEs 115$a$ and 115$b$ using 3D beamforming and coordinated spatial techniques, such as coordinated multipoint (CoMP) or multi-connectivity. The macro BS 105$d$ may perform backhaul communications with the BSs 105$a$-105$c$, as well as small cell, the BS 105$f$. The macro BS 105$d$ may also transmits multicast services which are subscribed to and received by the UEs 115$c$ and 115$d$. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115$e$, which may be airborne. Redundant communication links with the UE 115$e$ may include links from the macro BSs 105$d$ and 105$e$, as well as links from the small cell BS 105$f$. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105$f$, and the macro BS 105$e$, or in multi-action-size configurations by communicating with another user device which relays its information to the network, such as the UE 115$f$ communicating temperature measurement information to the smart meter, the UE 115$g$, which is then reported to the network through the small cell BS 105$f$. The network 100 may also provide additional network efficiency through dynamic, low-latency TDD/FDD communications, such as V2V, V2X, C-V2X communications between a UE 115$i$, 115$j$, or 115$k$ and other UEs 115, and/or vehicle-to-infrastructure (V2I) communications between a UE 115$i$, 115$j$, or 115$k$ and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing subscriptions corresponding to multiple SIMs and may switch priority between the SIMs as appropriate to accommodate co-banded DSDA operation, as explained in more detail below.

Figure 2:
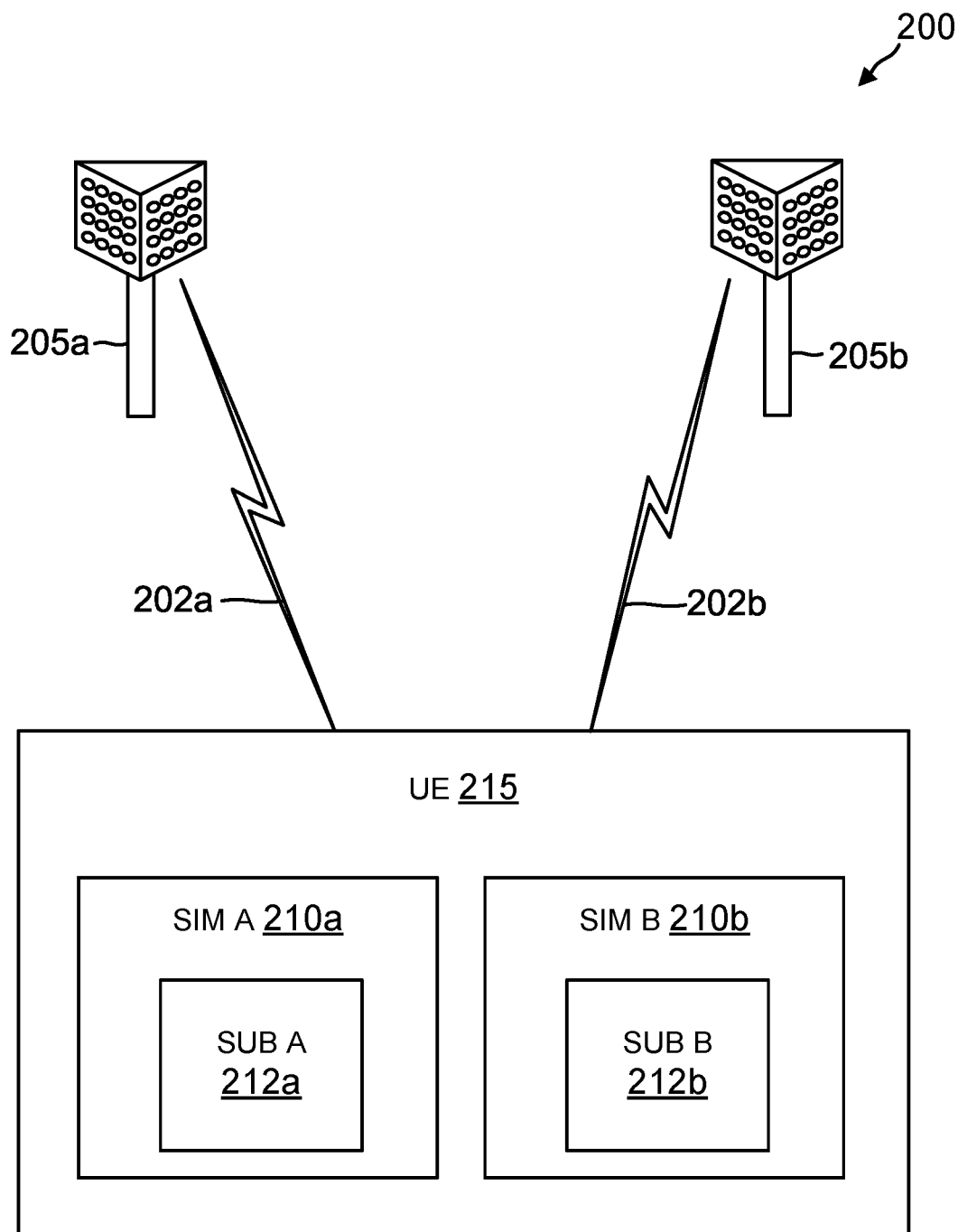
FIG. 2 illustrates a communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205a and 205b) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs (e.g., SIM cards) for communication with one or more networks. For simplicity, FIG. 2 illustrates the UE 215 including two SIMs 210 (shown as SIM A 210a and SIM B 210b), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210a and/or SIM B 210b may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212a (shown as SUB A) with the first operator and a second subscription 212b (shown as SUB B) with the second operator. Accordingly, the SIM A 210a may store or maintain information for accessing a network of the first operator based on the first subscription 212a, and the SIM B 210b may store information for accessing a network of the second operator based on the second subscription 212b.

In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

In some aspects, the UE 215 may operate in a DSDS mode, where both SIMs 210a and 210b can be on standby (in an idle mode) waiting to begin communications. When a communication is established for one SIM (e.g., the SIM A 210a), the other SIM (e.g., the SIM B 210b) is no longer active. That is, one subscription 212a or b may be active at a given time. In another example, the UE 215 may operate in a DSDA mode, where both subscriptions 212a and b may be active at a given time.

Furthermore, UE 215 may switch priority between SUB A and SUB B, allowing one or the other SUB to adjust gain settings and perform measurements, according to the techniques described below with respect to FIGS. 4-6.

Figure 3:
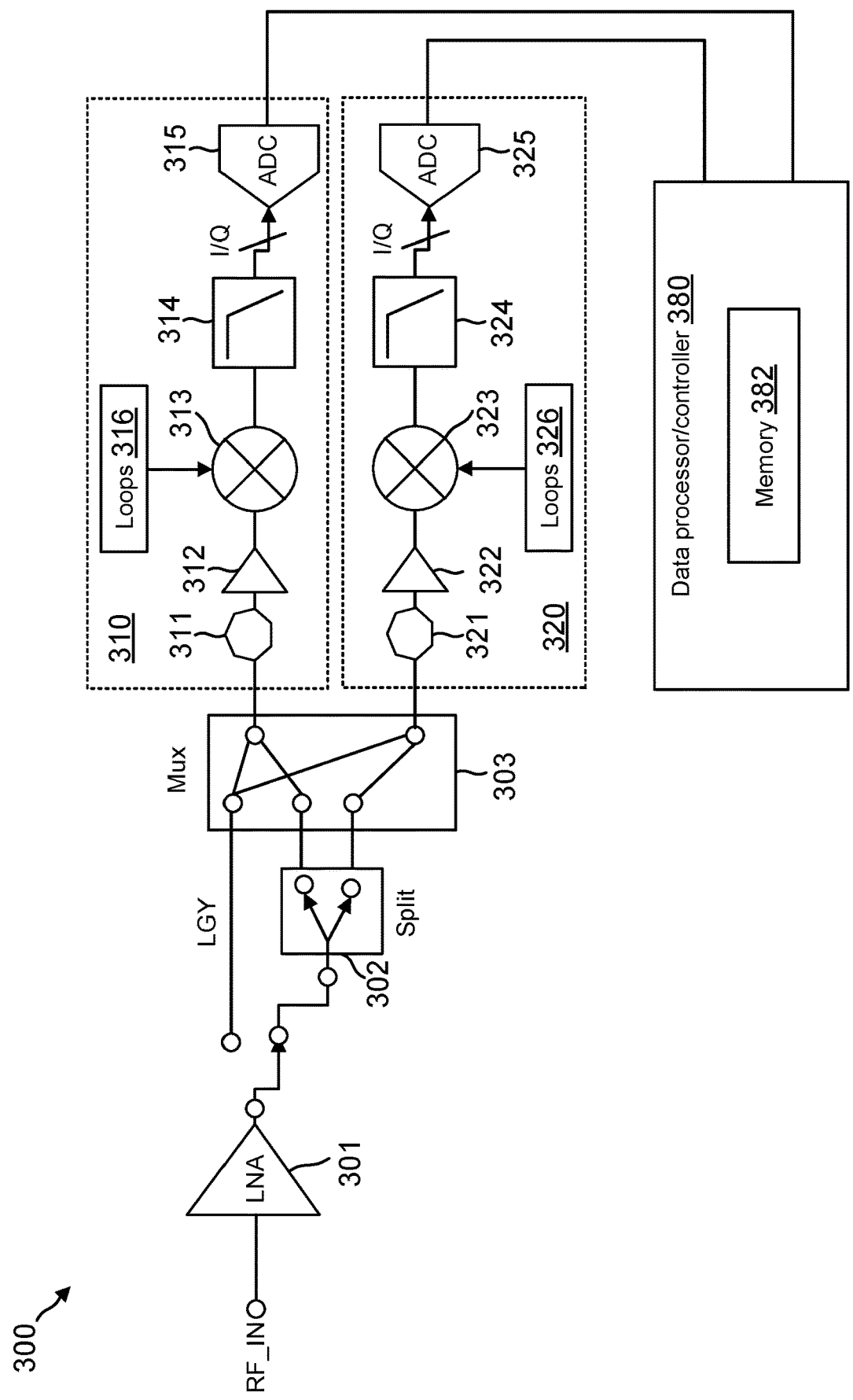
FIG. 3 is a block diagram of an architecture of a receive portion, such as in the UEs of FIGS. 1-2, according to some aspects of the present disclosure.
Figure 7:
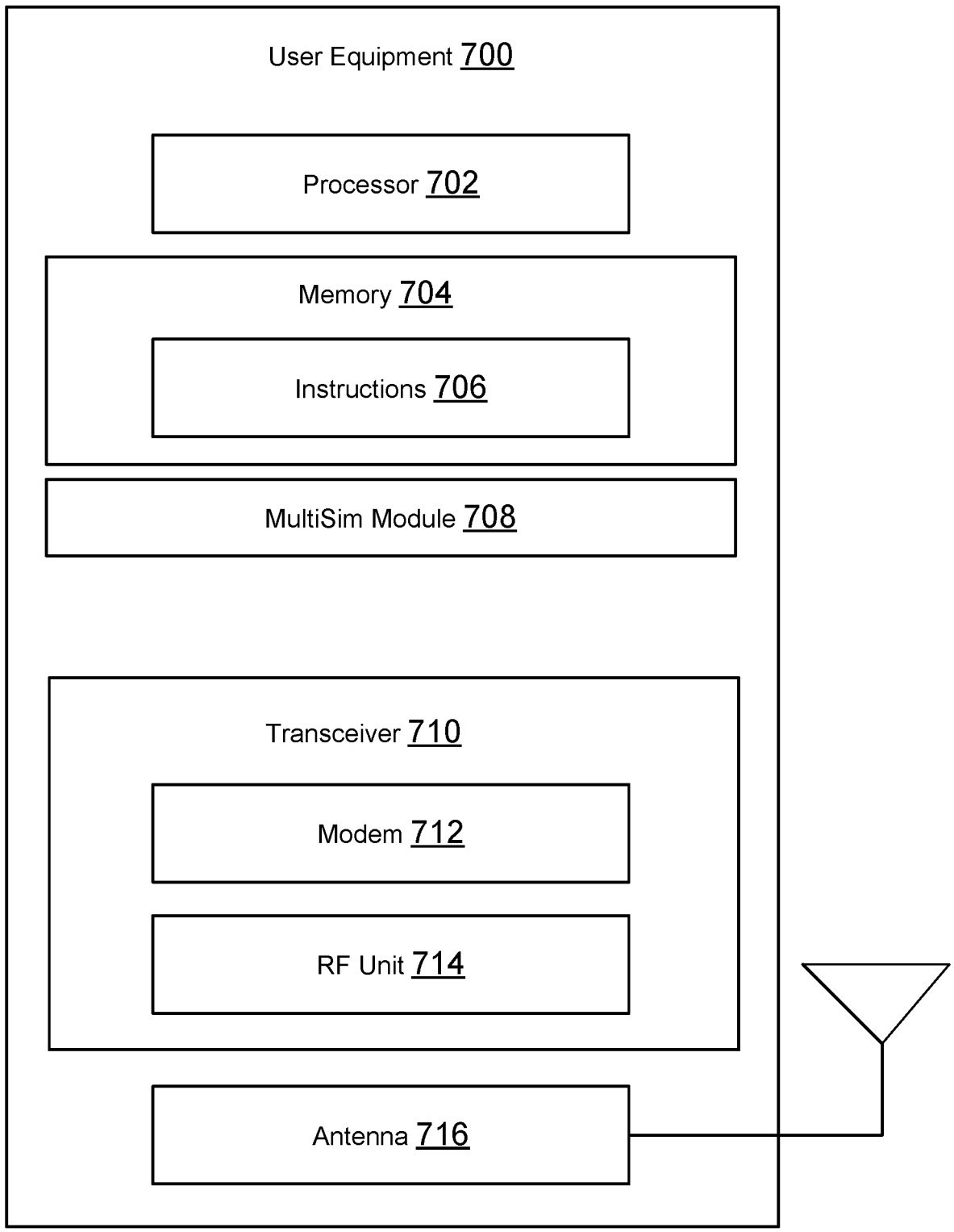
FIG. 7 illustrates a block diagram of a user equipment (UE) according to some aspects of the present disclosure.

FIG. 3 illustrates an example hardware architecture for RF chains, which may be implemented within UE 115 (FIG. 1), UE 215 (FIG. 2), or UE 700 (FIG. 7). In this exemplary design, the hardware architecture includes a RX portion 300 that may be part of a transceiver that also includes a TX portion (not shown). The RX portion 300 includes low noise amplifier (LNA) 301, a splitter 302, a multiplexer 303, and separate RF chains 310, 320. LNA 301 is an example of an external LNA (eLNA) and may receive an RF input (RF_IN) from an antenna (not shown). The LNA 301 applies a gain to the RF input and feeds the amplified signal to the splitter 302. The splitter 302 provides the amplified signal to both inputs of multiplexer 303, and the multiplexer 303 may be controlled by a select signal LGY to output the amplified signal to RF chain 310 or RF chain 320. In this example, RF chain 310 is associated with a first subscription (e.g., SUB A 212a) and RF chain 320 is associated with a second subscription (e.g., SUB B 212b).

For data reception, the antenna receives signals from base stations and/or other transmitter stations and provides RF_IN to LNA 301, which amplifies the input RF signal and provides an output RF signal. Each of the RF chains 310, 320 down converts the amplified RF signal from RF to baseband, amplifies and filters the downconverted signal, and provides an analog input signal to a data processor/controller 380. The RF chains 310, 320 include respective electrical contacts 311, 321, LNAs 312, 322, downconversion mixers 313, 323, baseband filters 314, 324, and analog-to-digital converters (ADCs) 315, 325. Of course, the scope of implementations is not limited to those components, as each RF chain 310, 320 may include other appropriate components, such as additional amplifiers, matching circuits, an oscillator, a local oscillator (LO) generator, a phase locked loop (PLL), etc. Furthermore, in this particular example, each of the mixers 313, 323 is controlled by a respective frequency tracking loop and time tracking loop 316, 326. The data processor/controller 380 may control the components in each of the RF chains 310, 320, including adjusting each of the loops 316, 326 based at least in part on measuring a reference signal. All or a portion of RX portion 300 may be implemented on one or more analog (ICs, RF ICs (RFICs), mixed-signal ICs, etc.

Data processor/controller 380 may perform various functions for wireless device 110. For example, data processor/controller 380 may perform processing for data being received via RX portion 300. Controller 380 may control the operation of the various components, such as LNA 301, multiplexer 303, and the components within the RF chains 310, 320. A memory 382 may store program codes and data for data processor/controller 380. Data processor/controller 380 may be implemented on one or more application specific integrated circuits (ASICs) and/or other ICs.

As noted above, RX portion 300 may be implemented as part of a transceiver and, in fact, that transceiver may be part of a multi-transceiver unit. In such an implementation, data processor/controller 380 may be in communication with multiple transceivers to provide DSDA operation in which one subscription may be transmitting and receiving data, while the other subscription may also transmit and receive data in a manner that appears concurrent to a human user. The data processor/controller 380 may execute software logic that assigns one of the transceivers to a particular subscription and the other one of the transceivers to the other subscription in a dual-SIM implementation. In another example, the data processor/controller 380 may assign both transceivers to both subscriptions, thereby allowing both subscriptions to employ multi-antenna operations, such as MIMO operation and beam forming.

In an implementation in which a first subscription corresponds to RF chain 310 and in which a second subscription corresponds to RF chain 320, both of those subscriptions share LNA 301. Accordingly, the first subscription may apply a gain setting for LNA 301, whereas the second subscription may be disabled from applying the gain setting for LNA 301, at least as long as the first subscription has a higher priority status. However, the second subscription may be able to apply gain at LNA 322 and filter 324 to achieve or at least approximate a desired gain setting. Similarly, the first subscription may also be able to apply gain settings at LNA 312 and filter 314. When the higher priority status is changed to apply to the second subscription, the second subscription may then change the gain setting at LNA 301, whereas the first subscription may be disabled from changing the gain setting at LNA 301. Furthermore, it would be expected that a subscription would measure reference signals and adjust its respective loops 316, 326 in response to the measurements. However, as noted above, some implementations may include "freezing the loop" of the subscription that is disallowed from adjusting the gain of the shared LNA 301. As priority switches from one subscription to the other, then the other subscription may have its loop frozen.

The scope of implementations is not limited to the particular architecture of RX portion 300, as other implementations may be different. For instance, another example implementation (not shown) combines electrical contacts 311, 321 into a single electrical contact, combines LNAs 312, 322 into a single LNA, and performs the splitting and multiplexing between the single LNA and respective mixers 313, 323. In other words, such other implementation includes an additional single LNA, corresponding to LNAs 312, 322, in the shared portion. The subscription having the higher priority at a given time would then control the LNA 301 as well as the additional LNA that corresponds to LNA 312, 322. In such an instance, the subscription not having the higher priority would achieve or approximate its desired gain using filter 324.

Figure 4:
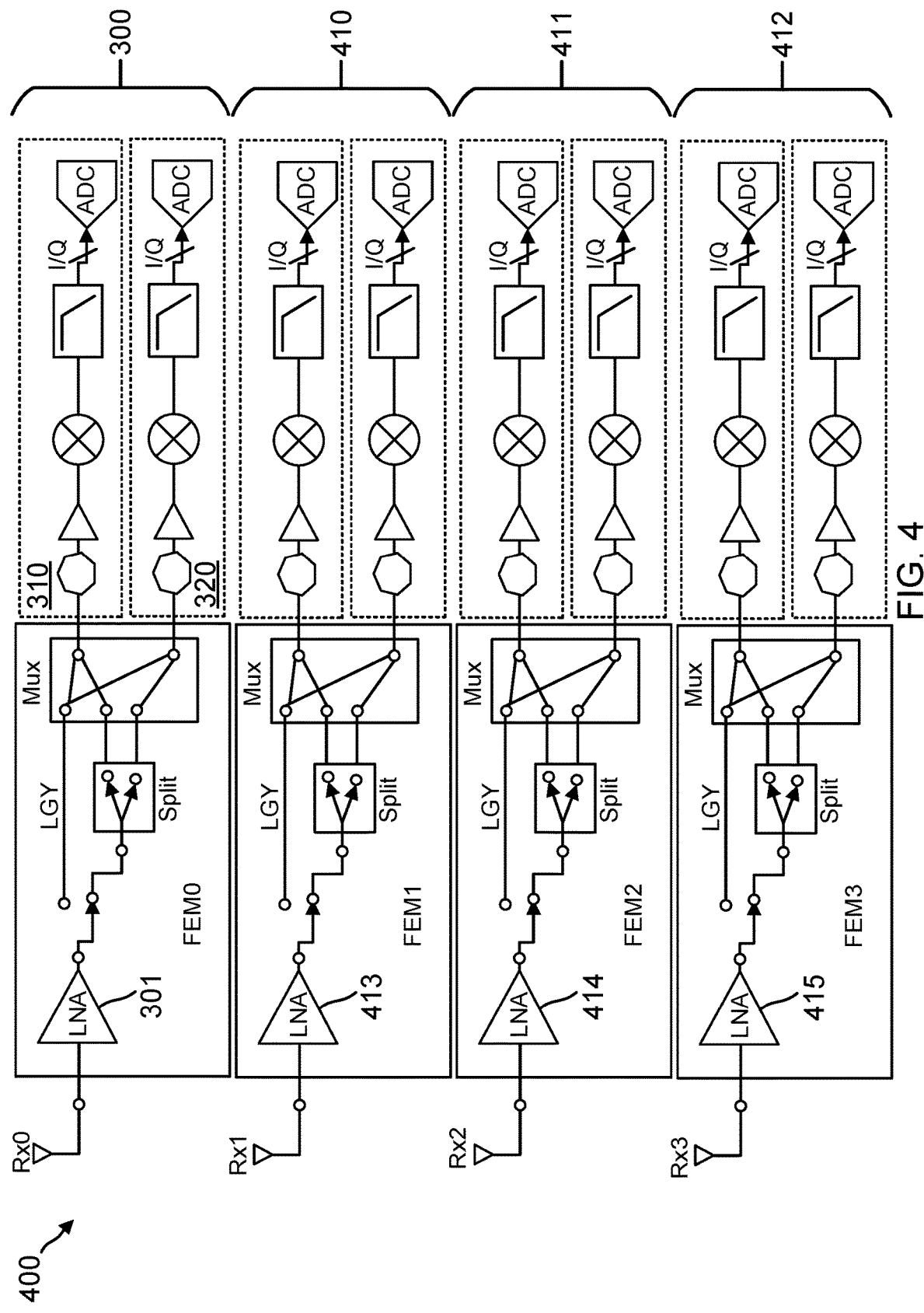
FIG. 4 is a block diagram of an architecture of a receive portion, such as in the UEs of FIGS. 1-2, according to some aspects of the present disclosure.
Figure 5:
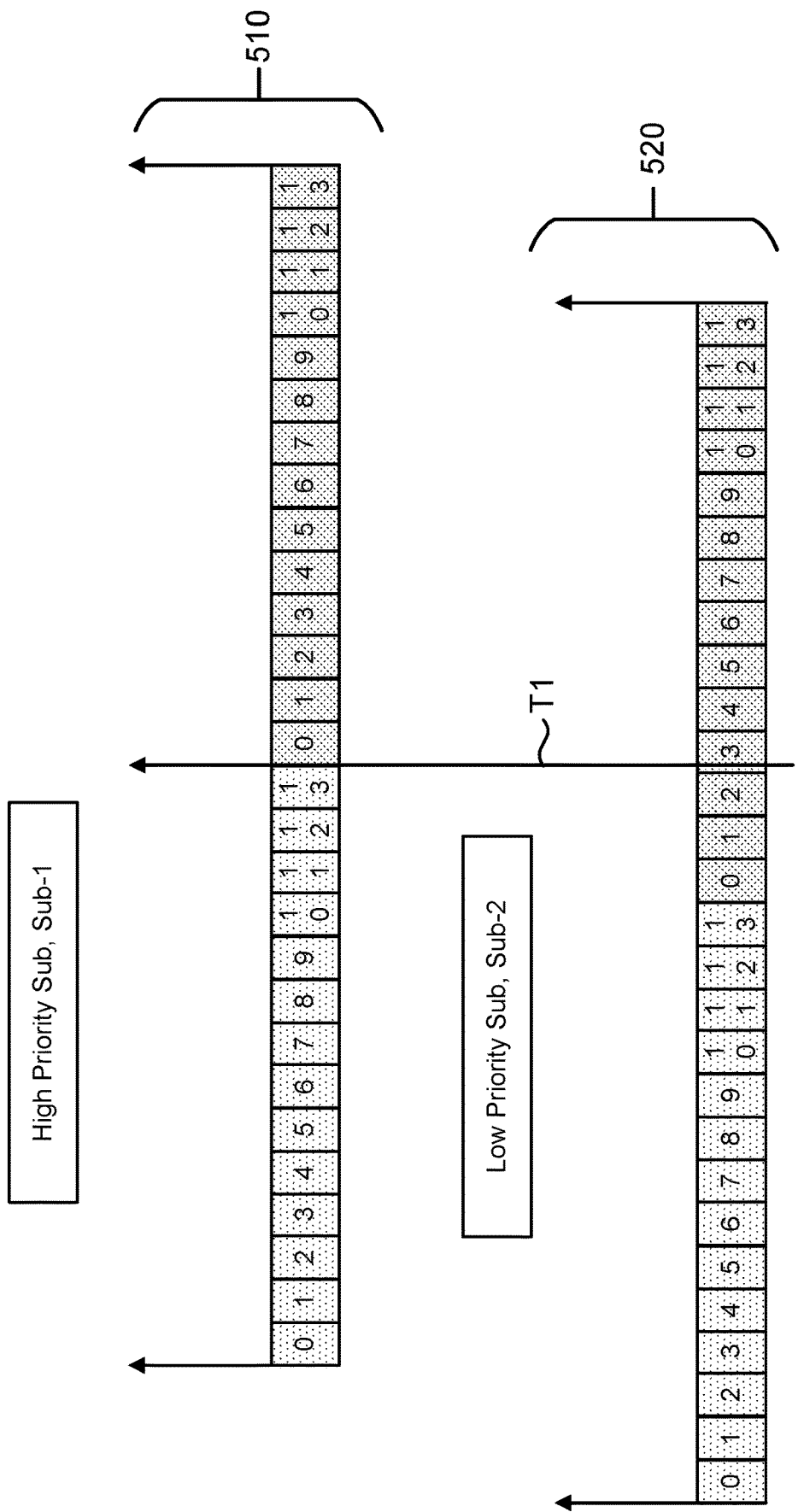
FIG. 5 is a diagram of time domain alignment in a multi-SIM device, according to some aspects of the disclosure.

FIG. 4 is an illustration of an example receiver architecture 400, according to one implementation. Receiver architecture 400 includes the RX portion 300 of FIG. 3 in combination with three other RX portions 410, 411, 412. Although not shown explicitly, it is understood that each of the RX portions 300, 410, 411, 412 would be coupled to data processor/controller 380 as shown in FIG. 3, and each of the RX portions 410, 411, 412 would be implemented and operated the same as or similar to RX portion 300 (explained in more detail above). Furthermore, each of the RX portions 300, 410, 411, 412 includes two RF chains, each of which may be assigned to one subscription or the other, so that one RF chain of each RX portion may be assigned to the first subscription and the other RF chain of each RX portion may be assigned to the second subscription.

Receiver architecture 400 includes multiple RX portions 300, 410, 411, 412 to support multiple frequency bands, multiple radio technologies, carrier aggregation, receive diversity, multiple input multiple output (MIMO) reception from multiple transmit antennas, etc. For instance, in this example, four MIMO layers are illustrated—RX0, RX1, RX2, RX3, indicating that the RX portions 300, 410, 411, 412 may be operated together by data processor/controller 380 to provide MIMO operation.

The scope of implementations is not limited to the specific architecture of FIG. 4. For instance, other implementations may include more or fewer RX portions and more or fewer MIMO layers. In fact, the number of RX portions may be scaled up or down according to a particular use case. Also, each of the RX portions 300, 410, 411, 412 includes a respective shared RF front end module FEM0-FEM3, each of which includes a respective LNA 301, 413, 414, 415 and splitter/multiplexer.

In an example, the receiver architecture 400 is included in a UE which is operating in a DSDA mode and using the four RX MIMO channels RX0, RX1, RX2, RX3. Furthermore in this example, the first subscription is assigned to one of the RF chains for each of the RX portions, and the second subscription is assigned to the other of the RF chains for each of the RX portions. Also, in this example, the first subscription and the second subscription are granted DL frequency resources within a same frequency band (e.g., N1) and, thus, are co-banded.

Continuing with the example, the first subscription and the second subscription may be granted DL resources that are not time-aligned. An example scenario is illustrated in FIG. 5, in which a time domain arrangement for DL slots for both the first subscription and the second subscription are illustrated. Slots 510 correspond to the first subscription, and slots 520 correspond to the second subscription. Assuming that the first subscription has the higher priority state, the first subscription times its gain state changes to align with a CP, as shown by time T1 and its relationship to slots 510 in which the time T1 occurs at the end of one symbol and the beginning of another symbol. When the gain state changes align with the CP, the transients associated with the gain state change may then be ignored or at least not allowed to interfere with useful data. However, the slots 510 do not align in time with the slots 520, and time T1 falls within a single symbol (labeled "3") in slots 520. In other words, the gain change that was controlled by the first subscription has caused transients that fall outside of a CP for slots 520 and may cause interference with data for the second subscription.

Figure 6:
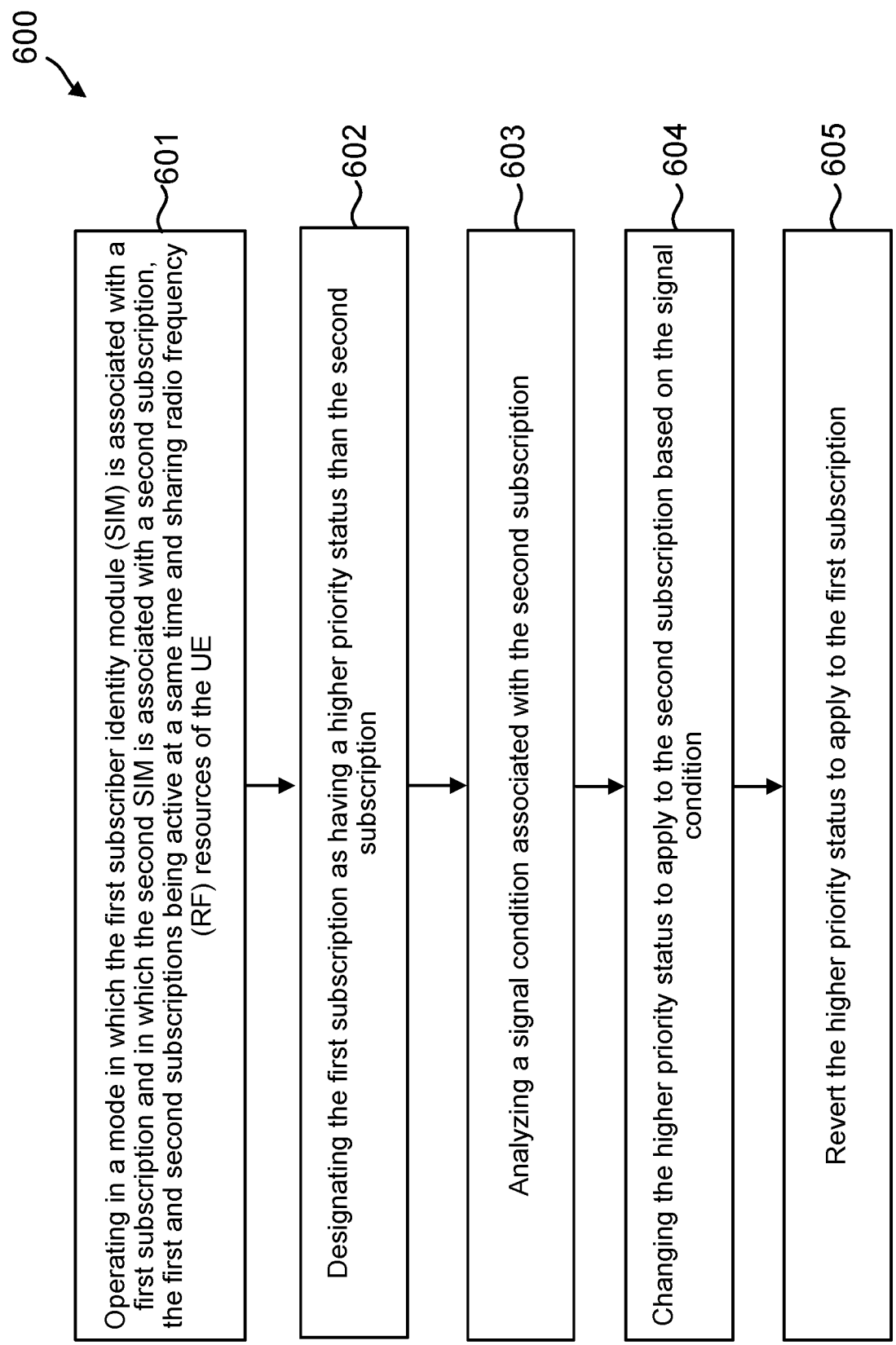
FIG. 6 is a diagram of an example method for operating tracking loops and setting gain settings, according to some aspects of the present disclosure.

Various implementations may perform techniques, such as explained in further detail with respect to FIG. 6, to accommodate a co-banded scenario when multiple subscriptions share RF hardware.

FIG. 6 is a flowchart of a method 600 to allow and disallow the different subscriptions of a UE to set a gain state of the shared RF device, according to some aspects of the present disclosure. The method 600 may be performed by a UE, such as UE 115 (FIG. 1), UE 215 (FIG. 2), or UE 700 (FIG. 7). As illustrated, the method 600 includes a number of enumerated actions, but aspects of the method 600 may include additional actions before, after, and in between the enumerated actions. In some aspects, one or more of the enumerated actions may be omitted or performed in a different order.

Method 600 may be performed in the context of a multi-SIM UE that has multiple communication sessions ongoing concurrently. In other words, the UE may support DSDA operation, such as by supporting a voice call on a first subscription and supporting web browsing or gaming on the second subscription. Furthermore, the first subscription and the second subscription may be operating in a co-banded scenario and may share RF hardware (e.g., LNA 301 of FIG. 3). Method 600 provides techniques for allowing one of the subscriptions to set and change gain for the RF hardware while freezing the loops of the other subscription. Of course, while method 600 addresses a scenario with two SIMs and two subscriptions, it is understood that the principles described herein may be scaled to apply to more than two SIMs and more than two subscriptions.

At action 601, the UE operates in a mode in which the first SIM is associated with a first subscription and in which the second SIM is associated with a second subscription. The first and second subscriptions are active at a same time and share RF resources, such as described above with respect to FIGS. 3-4.

Action 601 may include the UE participating in a first communication session associated with the first SIM. For instance, the first communication session may include a voice communication session that is associated with a first subscription. The UE also participates in a second communication session associated with a second SIM. For instance, the second communication session may include web browsing, gaming, or other use and may be associated with a second subscription.

At action 602, the UE designates the first subscription as having a higher priority status than the second subscription. Further in this example, the higher priority status allows the first subscription to adjust a gain setting of the shared RF resources and to update one or more tracking loops associated with the first subscription. Furthermore, the lower priority status associated with the second subscription may disable the second subscription from adjusting the gain setting of the shared RF resources or to update one or more tracking loops associated with the second subscription. For instance, the slots associated with the first and second communication sessions may be nonaligned in time so that transients caused by a gain setting adjustment may interfere with useful data or reference signal measurement of the second subscription. In an instance in which the transient may interfere with reference signal measurement, the UE may freeze the loops of the second subscription to avoid erroneous reference signal measurement and loop setting.

In a scenario in which the second subscription is disabled from adjusting the gain setting of the shared RF resources, the second subscription may adapt by adjusting gain settings of components that are not shared. An example of components that are not shared include the components within the RF chains 310, 320 of FIG. 3.

The designation of the higher priority status at action 602 may be a function of a default priority functionality of the UE, where the UE is programmed to have a priority hierarchy for different data use types. For instance, voice and video calls may have a top priority, gaming may have a second priority, web browsing and other functionality may have a third priority, and on and on. The scope of implementations is not limited to any priority hierarchy.

During operation while the first subscription has the higher priority status, and from time to time the UE may determine to adjust a gain setting on behalf of either or both of the first subscription and the second subscription. For instance, the UE may periodically measure total received signal strength indicator (RSSI) or some other measure of signal condition associated with the respective communication sessions. The signal condition measurement (e.g., RSSI) may then be used by the UE to calculate appropriate, respective gain settings. While the UE is able to adjust the gain setting of the shared hardware on behalf of the first subscription, the UE is disabled from adjusting the gain setting of the shared hardware on behalf of the second subscription. The UE may then adjust gain settings of non-shared components on behalf of the second subscription to achieve or approximate the desired gain for the second communication session. This may be repeated from time to time while the higher priority status is applied to the first subscription.

At action 603, the UE analyzes a signal condition associated with the second subscription. For instance, the signal condition may be analyzed by calculating a received power (e.g., RSSI), a delay, or some other signal condition indicator. Action 603 may further include determining a difference between the channel conditions of the two communication sessions. For instance, a power difference between the two communication sessions or a delay spread may be determined.

Additionally, the UE may include instructions for comparing a threshold against the signal conditions. For instance, a next action taken may be in response to a power difference between the two communication sessions being above or below the threshold or some other channel condition being above or below the threshold.

At action 604, the UE changes the higher priority status to apply to the second subscription based on the signal condition. For instance, the UE may determine that a power difference between the two communication sessions is below the threshold and may then determine to periodically swap the priorities of the two subscriptions. Periodically swapping the priorities of the two subscriptions may allow the tracking loops for both of the subscriptions to operate from time to time and with some fairness, thereby achieving a proper estimation of loop metrics for both loops. In one example, actions 604 and 605 include changing the priority from the first subscription, to the second subscription, and back to the first subscription repeatedly and perhaps according to a set period.

However, as the difference in power between the two communication sessions gets larger, periodically swapping the priority may be less desirable. For instance, say the first subscription is operating close to a sensitivity region, whereas the second subscription is operating within a good power level. Allowing the second subscription to control the shared RF resources may lead to call drops for the first subscription should the second subscription lower the gain of the shared RF resources. Therefore, in another example, the difference in power between the two communication sessions is above the threshold. Continuing with the example, the action 604 may include changing the priority so that it applies on a RF chain-by-RF chain basis rather than on a subscription-by-subscription basis.

Taking FIG. 4 as an example, the first subscription may be given the higher priority status for the modules that include RX portions 300, 410, and the second subscription may be given the higher priority status for the modules that include RX portions 411, 412. Therefore the RF chain 310, associated with the first subscription, would be given the higher priority status for the RX portion 300, and similarly the higher priority status would be applied in the same way at RX portion 410 so that the first subscription may change the gain settings of LNA 301, 413. The RF chains of the RX portions 300, 410 that are associated with the second subscription would be given the lower priority status. By contrast, the RF chains of RX portions 411, 412, which are associated with the second subscription would be given the higher priority status so that the second subscription may change the gain settings of LNAs 414, 450. The RF chains of RX portions 411, 412 which are associated with the first subscription would be given the lower priority status.

In some instances, the RF chain-by-RF chain technique of assigning the higher priority status may not optimize performance, but it may allow both subscriptions to carry on their respective communication sessions without interruption. Specifically, both subscriptions would be allowed to update their tracking loops and their gain settings with regular periodicity, at least for some of their RF chains, thereby preventing the tracking loops from drifting beyond the point at which the communication sessions would deteriorate.

At action 605, the UE reverts the higher priority status to the first subscription, at least in part. Continuing with the example above in which the higher priority status is distributed on a RF chain-by-RF chain basis, the RF chains with the higher priority status may be swapped from time to time if appropriate so that some chains associated with the first subscription are returned to the higher priority status. In an example in which the higher priority status is swapped on a subscription-by-subscription basis, the higher priority status may be given back to the first subscription on all of the RX portions 300, 410, 411, 412 based on a periodic assignment or other appropriate timing.

Although not shown in FIG. 6, method 600 may include additional or alternative functionalities. For instance, instead of, or in addition to, the higher priority status being changed based on the signal condition, other considerations may be taken into account. For instance, if one of the subscriptions experiences frequent mobility events, then that subscription may be given the higher priority status so as to improve its performance and perhaps reduce the number of mobility events.

Various implementations may include advantages. For instance, in multi-SIM UEs that share RF hardware between multiple subscriptions, the ability to set and change the higher priority status may increase communication session quality and improve call drops key performance indicators (KPIs) even when a power difference between communication sessions is large. Specifically, the techniques described with respect to FIGS. 4-6 may allow co-banded operation, even with shared RF resources, in a way that ensures fairness to the different subscriptions for setting tracking loops and gain. Fairness in setting tracking loops and gain may generally be expected to allow both subscriptions to operate with satisfactory performance and fewer call drops.

The actions 601-605 may be repeated as often as appropriate. For instance, as the UE moves from one base station to another base station, configurations may be changed, including UL frequency resource grants. While some frequency resource combinations may cause co-banded operation, other combinations may not cause co-banded operation, and as configurations change those frequency resource combinations may change. Accordingly, method 600 may be performed in response to band combinations that cause co-banded operation, whereas the UE may not perform method 600 when a band combination of the first communication session and the second communication session does not result in co-banded operation.

FIG. 7 is a block diagram of an exemplary UE 700 according to some aspects of the present disclosure. The UE 700 may be a UE 115 or UE 215 as discussed above in FIGS. 1-2 and may conform to the hardware architecture described above with respect to FIGS. 3-4. As shown, the UE 700 may include a processor 702, a memory 704, a multi-SIM module 708, a transceiver 710 including a modem subsystem 712 and a radio frequency (RF) unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to a UE 115, 215 in connection with aspects of the present disclosure, for example, aspects of FIGS. 3-5. Instructions 706 may also be referred to as code, which may include any type of computer-readable statements.

The Multi-SIM module 708 may be implemented via hardware, software, or combinations thereof. For example, the multi-SIM module 708 may be implemented as a processor, circuit, and/or instructions 706 stored in the memory 704 and executed by the processor 702.

In some aspects, the Multi-SIM module 708 may include multiple SIMs or SIM cards (e.g., 2, 3, 4, or more) similar to the SIMs 210. Each SIM may be configured to store information used for accessing a network, for example, to authenticate and identify the UE 700 as a subscriber of the network. Some examples of information stored on a SIM may include, but not limited to, a subscriber identity such as an international mobile subscriber identity (IMSI) and/or information and/or key used to identify and authenticate the UE 700 in a certain provider network. In some aspects, the UE 700 may have a first service provider subscription on a first SIM of the multiple SIMs and a second service provider subscription on a second SIM of the multiple SIMs. The first subscription may identify the UE 700 by a first subscriber identity, and the second subscription may identify the UE 700 by a second subscriber identity.

In some embodiments, the functionality described above with respect to FIGS. 4-5 may be included as logic within multi-SIM module 708. Other embodiments, the functionality may be included in another component, such as in computer readable code within instructions 706 in memory 704.

As shown, the transceiver 710 may include the modem subsystem 712 and the RF unit 714. The transceiver 710 can be configured to communicate bi-directionally with other devices, such as the BSs 105 and 800. The modem subsystem 712 may be configured to modulate and/or encode the data from the memory 704 and the multi-SIM module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 714 may be further configured to perform analog beamforming in conjunction with digital beamforming. Although shown as integrated together in transceiver 710, the modem subsystem 712 and the RF unit 714 may be separate devices that are coupled together at the UE 700 to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., RRC configurations, MIB, PDSCH data and/or PDCCH DCIs, etc.) to the multi-SIM module 708 for processing. The antennas 716 may include multiple antennas of similar or different designs in order to sustain multiple transmission links.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
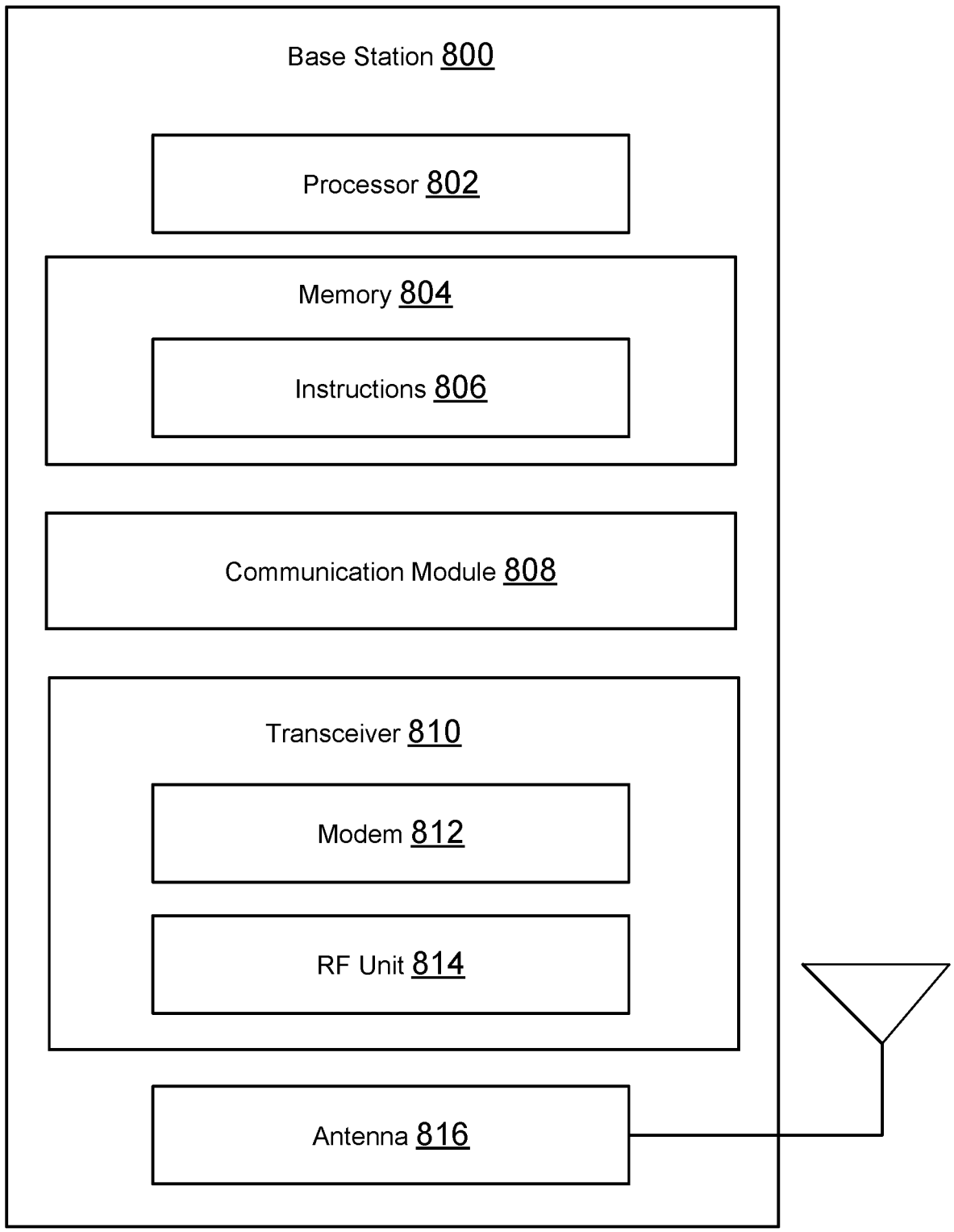
FIG. 8 illustrates a block diagram of a base station (BS) according to some aspects of the present disclosure.

FIG. 8 is a block diagram of an exemplary BS 800 according to some aspects of the present disclosure. The BS 800 may be a BS 105 or a BS 205 as discussed in FIGS. 1 and 2. As shown, the BS 800 may include a processor 802, a memory 804, a communication module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1 and 2. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 808 may be implemented via hardware, software, or combinations thereof. For example, the communication module 808 may be implemented as a processor, circuit, and/or instructions 806 stored in the memory 804 and executed by the processor 802. In some examples, the communication module 808 can be integrated within the modem subsystem 812. For example, the communication module 808 can be implemented by a combination of software components (e.g., executed by a DSP or a general processor) and hardware components (e.g., logic gates and circuitry) within the modem subsystem 812. The communication module 808 may communicate with one or more components of BS 800 to implement various aspects of the present disclosure, for example, aspects of FIGS. 1 and 2.

As shown, the transceiver 810 may include the modem subsystem 812 and the RF unit 814. The transceiver 810 can be configured to communicate bi-directionally with other devices, such as the UEs 115, 215 and/or UE 700 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 812 (on outbound transmissions) or of transmissions originating from another source such as a UE 115, 215, and/or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., PUSCH data, PUCCH UCI, MSG1, MSG3, etc.) to the communication module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Further aspects of the present disclosure include the following clauses:

1. A method of wireless communication performed by a user equipment (UE) that has a first subscriber identity module (SIM) and a second SIM, the method comprising:
   operating in a mode in which the first SIM is associated with a first subscription and in which the second SIM is associated with a second subscription, the first and second subscriptions being active at a same time and sharing radio frequency (RF) resources of the UE;
   designating the first subscription as having a higher priority status than the second subscription;
   analyzing a signal condition associated with the second subscription; and changing the higher priority status to apply to the second subscription based on the signal condition.
2. The method of clause 1, wherein the designating the first subscription as having the higher priority status comprises:
   disabling the second subscription from updating a frequency loop associated with the second subscription and enabling the first subscription to adjust a gain setting of the shared RF resources of the UE.
3. The method of clause 2, wherein the shared RF resources comprise a first low noise amplifier (LNA), the method further comprising:
   adjusting the gain setting of the LNA on behalf of the first subscription.
4. The method of any of clauses 1-3, wherein the designating the first subscription as having the higher priority status comprises:
   disabling the second subscription from updating a time tracking loop associated with the second subscription and enabling the first subscription to adjust a gain setting of the shared RF resources of the UE.
5. The method of any of clauses 1-4, wherein analyzing the signal condition comprises:
   determining that a difference in power between signals associated with the first subscription and signals associated with the second subscription falls below a threshold; and
   wherein changing the higher priority status to apply to the second subscription comprises: switching the higher priority status away from a first plurality of RF chains associated with the first subscription and to a second plurality of RF chains associated with the second subscription.
6. The method of any of clauses 1-5, wherein analyzing the signal condition comprises:
   determining that a difference in power between signals associated with the first subscription and signals associated with the second subscription is above a threshold; and
   wherein changing the higher priority status to apply to the second subscription comprises: switching the higher priority status away from a first RF chain associated with the first subscription and to a second RF chain associated with the second subscription, wherein the higher priority status stays with a third RF chain associated with the first subscription.
7. The method any of clauses 1-6, wherein changing the higher priority status to apply to the second subscription is further performed in response to analyzing a mobility condition associated with the second subscription.
8. The method of clause 7, wherein analyzing the mobility condition comprises determining that the first subscription performs a quantity of mobility operations, within a time period, greater than a threshold.
9. The method any of clauses 1-8, further comprising:
   returning the higher priority status to the first subscription based at least in part on a change in the signal condition.
10. The method any of clauses 1-9, wherein the mode includes the first subscription and the second subscription performing reception on at least one frequency band in common.
11. The method any of clauses 1-10, wherein the first SIM is designated as a default data subscription (DDS).
12. The method any of clauses 1-11, wherein designating the first subscription as having the higher priority status comprises:
   allowing the first subscription to control one or more loops of the UE and to control a gain of a component of the shared RF resources; and
   disallowing the second subscription to control the one or more loops of the UE and to control the gain of the component of the shared RF resources.
13. The method of clause 12, wherein changing the higher priority status to apply to the second subscription comprises:

allowing the second subscription to control the one or more loops of the UE and to control the gain of the component of the shared RF resources; and disallowing the first subscription to control the one or more loops of the UE and to control the gain of the component of the shared RF resources.

14. The method of clause 12, wherein designating the first subscription as having the higher priority status is performed based on a type of service provided on the first subscription.

15. The method of any of clauses 1-14, wherein changing the higher priority status is included in a periodic swap of the higher priority status between the first subscription and the second subscription.

16. A user equipment (UE) comprising:
   a first subscriber identity module (SIM) associated with a first service provider subscription and a second SIM associated with a second service provider subscription; and
   a processor configured to access the first SIM and the second SIM, wherein the processor is further configured to:
      operate in a dual-SIM dual active (DSDA) mode in which a first communication session associated with the first service provider subscription is concurrently ongoing with a second communication session associated with the second service provider subscription;
      change a gain setting of a radio frequency (RF) component on behalf of the first service provider subscription, wherein the RF component includes an amplifier that is shared by the first service provider subscription and the second service provider subscription;
      freeze a second tracking loop associated with the second service provider subscription;
      swap a status setting associated with the first service provider subscription and the second service provider subscription, wherein the status setting once swapped allows for changing the gain setting of the RF component on behalf of the second service provider subscription and for freezing a first tracking loop associated with the first service provider subscription; and
      revert the status setting to disallow changing the gain setting of the RF component on behalf of the second service provider subscription and to freeze the second tracking loop.

17. The UE of clause 16, wherein the processor is configured to swap the status setting and revert the status setting periodically and repeatedly in response to a signal condition of either or both of the first service provider subscription and the second service provider subscription.

18. The UE any of clauses 16-17, wherein the processor is configured to swap the status setting and revert the status setting periodically and repeatedly in response to a power difference between a first signal associated with the first service provider subscription and a second signal associated with the second service provider subscription.

19. The UE any of clauses 16-18, wherein the processor is configured to swap the status setting and revert the status setting on an RF chain-by-RF chain basis within a plurality of RF chains of the UE, wherein a first subset of the plurality of RF chains are associated with the first service provider subscription and a second subset of the plurality of RF chains are associated with the second service provider subscription.

20. The UE any of clauses 16-19, wherein the processor is configured to swap the status setting and revert the status setting in response to a power difference, between a first signal associated with the first service provider subscription and a second signal associated with the second service provider subscription, being larger than a threshold.

21. The UE any of clauses 16-20, wherein the processor is configured to swap the status setting and revert the status setting in response to a mobility event of the UE.

22. A non-transitory computer-readable medium having program code recorded thereon for wireless communication by a user equipment (UE), the program code comprising:
   code for concurrently supporting a first communication session associated with a first service provider subscription and a second communication session associated with a second service provider subscription, wherein the first service provider subscription and the second service provider subscription share radio frequency (RF) hardware of the UE;
   code for designating the first service provider subscription as having a higher priority status than the second service provider subscription, wherein the higher priority status allows the first service provider subscription to control a gain of the RF hardware;
   code for analyzing a signal condition associated with the second service provider subscription; and
   code for changing the higher priority status to apply to the second service provider subscription based on the signal condition.

23. The non-transitory computer-readable medium of clause 22, wherein the code for designating the first service provider subscription as having the higher priority status comprises:
   code for allowing the first service provider subscription to control one or more tracking loops of the UE; and
   code for disallowing the second service provider subscription to control the one or more tracking loops of the UE and to control the gain of the RF hardware.

24. The non-transitory computer-readable medium of clause 23, wherein the code for changing the higher priority status to apply to the second service provider subscription comprises:
   code for allowing the second service provider subscription to control the one or more tracking loops of the UE and to control the gain of the RF hardware; and
   code for disallowing the first service provider subscription to control the one or more tracking loops of the UE and to control the gain of the RF hardware.

25. A user equipment (UE) comprising:
   a first subscriber identity module (SIM) associated with a first service provider subscription and a second SIM associated with a second service provider subscription;
   means for concurrently supporting a first communication session associated with the first service provider subscription and a second communication session associated with the second service provider subscription;
   means for changing a gain setting of a radio frequency (RF) component on behalf of the first service provider subscription, wherein the RF component includes an amplifier that is shared by the first service provider subscription and the second service provider subscription;
   means for freezing a second tracking loop associated with the second service provider subscription;
   means for swapping a status setting associated with the first service provider subscription and the second service provider subscription, wherein the status setting once swapped allows for changing the gain setting of the RF component on behalf of the second service provider subscription and for freezing a first tracking loop associated with the first service provider subscription; and means for reverting the status setting to disallow changing the gain setting of the RF component on behalf of the second service provider subscription and to freeze the second tracking loop.

26. The UE of clause 25, wherein the means for swapping the status setting is configured to change the status setting periodically and repeatedly in response to a signal condition of either or both of the first service provider subscription and the second service provider subscription.

27. The UE any of clauses 25-26, wherein the means for swapping the status setting is configured to change the status setting periodically and repeatedly in response to a power difference between a first signal associated with the first service provider subscription and a second signal associated with the second service provider subscription.

28. The UE any of clauses 25-27, wherein the means for swapping the status setting is configured to change the status setting on an RF chain-by-RF chain basis within a plurality of RF chains of the UE, wherein a first subset of the plurality of RF chains are associated with the first service provider subscription and a second subset of the plurality of RF chains are associated with the second service provider subscription.

29. The UE any of clauses 25-28, wherein the means for swapping the status setting is configured to change the status setting in response to a power difference, between a first signal associated with the first service provider subscription and a second signal associated with the second service provider subscription, being larger than a threshold.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE) that has a first subscriber identity module (SIM) and a second SIM, the method comprising:

operating in a dual-SIM dual-active (DSDA) mode in which the first SIM is associated with a first subscription and in which the second SIM is associated with a second subscription, the first and second subscriptions being active at a same time and sharing a radio frequency (RF) amplifier of the UE;

designating the first subscription as having a higher priority status than the second subscription;

analyzing a signal condition associated with the second subscription; and changing the higher priority status to apply to the second subscription based on the signal condition.

2. The method of claim 1, wherein the designating the first subscription as having the higher priority status comprises:

disabling the second subscription from updating a frequency loop associated with the second subscription and enabling the first subscription to adjust a gain setting of the shared RF amplifier of the UE.

3. The method of claim 2, wherein the shared RF amplifier comprises a first low noise amplifier (LNA), the method further comprising:

adjusting the gain setting of the LNA on behalf of the first subscription.

4. The method of claim 1, wherein the designating the first subscription as having the higher priority status comprises:

disabling the second subscription from updating a time tracking loop associated with the second subscription and enabling the first subscription to adjust a gain setting of the shared RF amplifier of the UE.

5. The method of claim 1, wherein analyzing the signal condition comprises:

determining that a difference in power between signals associated with the first subscription and signals associated with the second subscription falls below a threshold; and wherein changing the higher priority status to apply to the second subscription comprises: switching the higher priority status away from a first plurality of RF chains associated with the first subscription and to a second plurality of RF chains associated with the second subscription.

6. The method of claim 1, wherein analyzing the signal condition comprises:

determining that a difference in power between signals associated with the first subscription and signals associated with the second subscription is above a threshold; and wherein changing the higher priority status to apply to the second subscription comprises: switching the higher priority status away from a first RF chain associated with the first subscription and to a second RF chain associated with the second subscription, wherein the higher priority status stays with a third RF chain associated with the first subscription.

7. The method of claim 1, wherein changing the higher priority status to apply to the second subscription is further performed in response to analyzing a mobility condition associated with the second subscription.

8. The method of claim 7, wherein analyzing the mobility condition comprises determining that the first subscription performs a quantity of mobility operations, within a time period, greater than a threshold.

9. The method of claim 1, further comprising:
returning the higher priority status to the first subscription based at least in part on a change in the signal condition.

10. The method of claim 1, wherein the mode includes the first subscription and the second subscription performing reception on at least one frequency band in common.

11. The method of claim 1, wherein the first SIM is designated as a default data subscription (DDS).

12. The method of claim 1, wherein designating the first subscription as having the higher priority status comprises:
allowing the first subscription to control one or more loops of the UE and to control a gain of a component of the shared RF amplifier; and
disallowing the second subscription to control the one or more loops of the UE and to control the gain of the component of the shared RF amplifier.

13. The method of claim 12, wherein changing the higher priority status to apply to the second subscription comprises:
allowing the second subscription to control the one or more loops of the UE and to control the gain of the component of the shared RF amplifier; and
disallowing the first subscription to control the one or more loops of the UE and to control the gain of the component of the shared RF amplifier.

14. The method of claim 12, wherein designating the first subscription as having the higher priority status is performed based on a type of service provided on the first subscription.

15. The method of claim 1, wherein changing the higher priority status is included in a periodic swap of the higher priority status between the first subscription and the second subscription.

16. A user equipment (UE) comprising:
a first subscriber identity module (SIM) associated with a first service provider subscription and a second SIM associated with a second service provider subscription; and
a processor configured to access the first SIM and the second SIM, wherein the processor is further configured to:
operate in a dual-SIM dual active (DSDA) mode in which a first communication session associated with the first service provider subscription is concurrently ongoing with a second communication session associated with the second service provider subscription;
change a gain setting of a radio frequency (RF) component on behalf of the first service provider subscription, wherein the RF component includes an amplifier that is shared by the first service provider subscription and the second service provider subscription;
freeze a second tracking loop associated with the second service provider subscription;
swap a status setting associated with the first service provider subscription and the second service provider subscription, wherein the status setting once swapped allows for changing the gain setting of the RF component on behalf of the second service provider subscription and for freezing a first tracking loop associated with the first service provider subscription; and
revert the status setting to disallow changing the gain setting of the RF component on behalf of the second service provider subscription and to freeze the second tracking loop.

17. The UE of claim 16, wherein the processor is configured to swap the status setting and revert the status setting periodically and repeatedly in response to a signal condition of either or both of the first service provider subscription and the second service provider subscription.

18. The UE of claim 16, wherein the processor is configured to swap the status setting and revert the status setting periodically and repeatedly in response to a power difference between a first signal associated with the first service provider subscription and a second signal associated with the second service provider subscription.

19. The UE of claim 16, wherein the processor is configured to swap the status setting and revert the status setting on an RF chain-by-RF chain basis within a plurality of RF chains of the UE, wherein a first subset of the plurality of RF chains are associated with the first service provider subscription and a second subset of the plurality of RF chains are associated with the second service provider subscription.

20. The UE of claim 16, wherein the processor is configured to swap the status setting and revert the status setting in response to a power difference, between a first signal associated with the first service provider subscription and a second signal associated with the second service provider subscription, being larger than a threshold.

21. The UE of claim 16, wherein the processor is configured to swap the status setting and revert the status setting in response to a mobility event of the UE.

22. A non-transitory computer-readable medium having program code recorded thereon for wireless communication by a user equipment (UE), the program code comprising:
code for operating in a dual-SIM dual-Active (DSDA) mode in which the UE concurrently supports a first communication session associated with a first service provider subscription and a second communication session associated with a second service provider subscription, wherein the first service provider subscription and the second service provider subscription share a radio frequency (RF) amplifier of the UE;
code for designating the first service provider subscription as having a higher priority status than the second service provider subscription, wherein the higher priority status allows the first service provider subscription to control a gain of the RF amplifier of the UE;
code for analyzing a signal condition associated with the second service provider subscription; and
code for changing the higher priority status to apply to the second service provider subscription based on the signal condition.

23. The non-transitory computer-readable medium of claim 22, wherein the code for designating the first service provider subscription as having the higher priority status comprises:
code for allowing the first service provider subscription to control one or more tracking loops of the UE; and
code for disallowing the second service provider subscription to control the one or more tracking loops of the UE and to control the gain of the RF amplifier of the UE.

24. The non-transitory computer-readable medium of claim 23, wherein the code for changing the higher priority status to apply to the second service provider subscription comprises:
- code for allowing the second service provider subscription to control the one or more tracking loops of the UE and to control the gain of the RF amplifier of the UE; and
- code for disallowing the first service provider subscription to control the one or more tracking loops of the UE and to control the gain of the RF amplifier of the UE.

25. A user equipment (UE) comprising:
- a first subscriber identity module (SIM) associated with a first service provider subscription and a second SIM associated with a second service provider subscription;
- means for concurrently supporting a first communication session associated with the first service provider subscription and a second communication session associated with the second service provider subscription;
- means for changing a gain setting of a radio frequency (RF) component on behalf of the first service provider subscription, wherein the RF component includes an amplifier that is shared by the first service provider subscription and the second service provider subscription;
- means for freezing a second tracking loop associated with the second service provider subscription;
- means for swapping a status setting associated with the first service provider subscription and the second service provider subscription, wherein the status setting once swapped allows for changing the gain setting of the RF component on behalf of the second service provider subscription and for freezing a first tracking loop associated with the first service provider subscription; and
- means for reverting the status setting to disallow changing the gain setting of the RF component on behalf of the second service provider subscription and to freeze the second tracking loop.

26. The UE of claim 25, wherein the means for swapping the status setting is configured to change the status setting periodically and repeatedly in response to a signal condition of either or both of the first service provider subscription and the second service provider subscription.

27. The UE of claim 25, wherein the means for swapping the status setting is configured to change the status setting periodically and repeatedly in response to a power difference between a first signal associated with the first service provider subscription and a second signal associated with the second service provider subscription.

28. The UE of claim 25, wherein the means for swapping the status setting is configured to change the status setting on an RF chain-by-RF chain basis within a plurality of RF chains of the UE, wherein a first subset of the plurality of RF chains are associated with the first service provider subscription and a second subset of the plurality of RF chains are associated with the second service provider subscription.

29. The UE of claim 25, wherein the means for swapping the status setting is configured to change the status setting in response to a power difference, between a first signal associated with the first service provider subscription and a second signal associated with the second service provider subscription, being larger than a threshold.

* * * * *